Oct. 7, 1924.  
W. H. HEIL  
TRANSMISSION BAND LINING  
Filed Aug. 11, 1923  
1,511,126
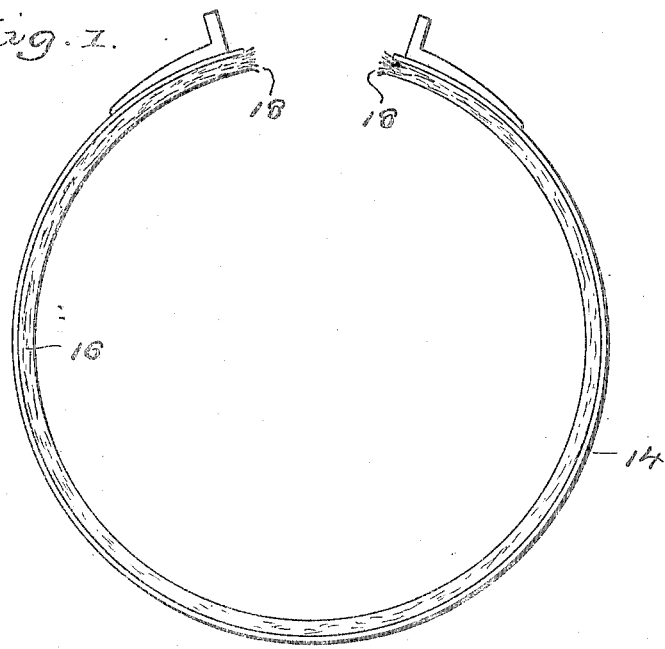
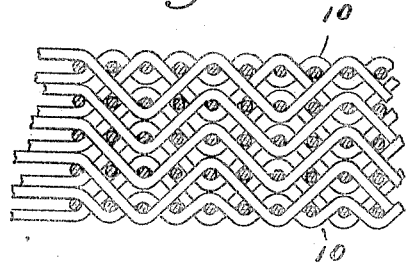
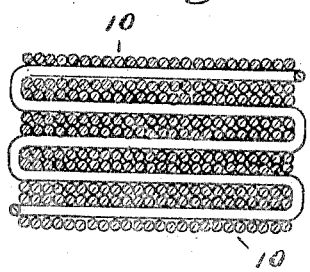
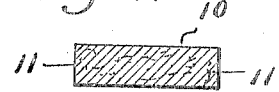
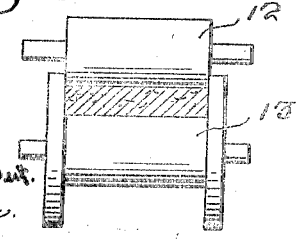
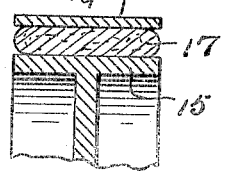
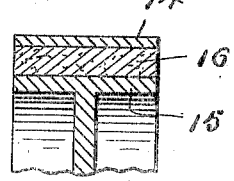

Patented Oct. 7, 1924.

1,511,126

UNITED STATES PATENT OFFICE.

WILLIAM H. HEIL, OF PATERSON, NEW JERSEY.

TRANSMISSION-BAND LINING.

Application filed August 11, 1923. Serial No. 656,861.

*To all whom it may concern:*

Be it known that I, WILLIAM H. HEIL, a citizen of the United States, residing at Paterson, in the county of Passaic and State of New Jersey, have invented new and useful Improvements in Transmission-Band Linings, of which the following is a specification.

This invention relates to band linings and to the method of making the same, an object being to provide a lining which is especially adapted for automobile transmissions of the planetary type.

In mechanisms of this character it is desirable to obtain the maximum amount of bearing between the lining and the drum and as these drums (as in the Ford automobile) are placed close together, this is not possible with the round edge type of lining now in use. Further, in order to provide for long wear it is essential that a maximum number of threads be used in a woven fabric lining and that the fabric be of a tough yet pliable character.

Heretofore, woven band linings for this purpose have been woven of a thickness and width of the finished product, with a result that the fabric is of a more or less loose weave irrespective of the manner in which the fabric is woven. In the present invention however, the fabric is woven to a greater thickness than the finished product, which permits of the use of an increased number of threads, and this fabric is passed between rollers and pressed to the desired thickness and width, so that a relatively hard compact lining results.

With the above and other objects in view, the invention further includes the following novel features and details of construction, to be hereinafter more fully described, illustrated in the accompanying drawings and pointed out in the appended claims.

In the drawings:—

Figure 1 is an elevation of a transmission band with the lining applied thereto.

Figure 2 is an enlarged fragmentary longitudinal section illustrating the character of the weave.

Figure 3 is a transverse sectional view of the same.

Figure 4 is a diagrammatic view illustrating the cross sectional shape of the fabric after weaving and before pressing.

Figure 5 is a similar view showing the fabric pressed to the required thickness and width.

Figure 6 is a fragmentary cross sectional view of the prior art showing a round edge lining applied to a transmission band.

Figure 7 is a similar view showing a square edge lining and illustrating the increased bearing surface obtained thereby.

Referring to the drawings in detail wherein like characters of reference denote corresponding parts, the fabric lining is illustrated as formed of a plurality of warp and woof threads woven so as to provide opposite relatively wide surfaces 10 and square edges 11.

The fabric is woven to a greater thickness than the thickness of the finished lining, being reduced to the proper thickness and width by pressure, such as passing it between pressure rollers 12 and 13. The finished lining is then of the proper thickness and is of the same width as the band 14 and drum 15 with which it is used.

It will be noted by comparison of Figures 6 and 7 of the drawings that the lining which is indicated at 16 is of the same width as the width of the band and drum, while the round edge lining indicated at 17 in Figure 6 is also of the same width but the bearing surface of the lining is less than the lining 16 due to the rounded edges. In addition, by subjecting the woven lining to pressure as stated a tight compact lining is provided which, owing to its original thickness may contain an increased number of threads. The life of the lining is thus materially lengthened.

In order to insure proper absorption of oil, the ends of the lining are raveled as indicated at 18 in Figure 1 of the drawings, so that the threads will absorb oil after the manner of a wick and the lining thus remain properly lubricated.

In addition to providing an increased amount of material, the increased number of threads of the woven lining also provides for an increased absorption of lubricant, so that the drums are kept properly lubricated and wear upon the lining reduced as well as tendency of the band to "chatter". Further, the increase of material after the lining is compressed adds body and stability to the lining and reinforces the band, so that the latter will be maintained in proper circular formation to grip the drum evenly around its surface, instead of at spaced point, as is the case with flimsily made linings.

The invention is susceptible of various changes in its form, proportions and minor details of construction and the right is herein reserved to make such changes as properly fall within the scope of the appended claims.

Having described the invention what is claimed is:—

1. A transmission lining formed of a woven fabric having square side edges substantially flush with the side edges of the transmission drum and the band to which it is applied, and having its ends raveled to provide for a ready absorption of lubricant.

2. A method of making woven lining for bands consisting in forming a strip of woven fabric of a greater thickness than the thickness of the finished lining and containing only the warp and weft yarns and subjecting it to pressure to form a compact strip of the desired thickness and width.

3. A method of making woven lining for bands consisting in forming a strip of woven fabric of a greater thickness than the thickness of the finished lining and containing only the warp and weft yarns and subjecting it to pressure to form a compact strip of the desired thickness and width and ravelling its ends to provide for a ready absorption of lubricant.

In testimony whereof I affix my signature.

WILLIAM H. HEIL.